United States Patent [19]

Lin

[11] Patent Number: 5,766,702
[45] Date of Patent: *Jun. 16, 1998

[54] LAMINATED ORNAMENTAL GLASS

[76] Inventor: Chii-Hsiung Lin, No. 55, Dai Jen Street, Kaohsiung, Taiwan

[*] Notice: The term of this patent shall not extend beyond the expiration date of Pat. No. 5,370,413.

[21] Appl. No.: 539,640

[22] Filed: Oct. 5, 1995

[51] Int. Cl.⁶ .................................................. B32B 9/00
[52] U.S. Cl. .......................... 428/13; 428/34; 428/187; 428/195; 428/201; 428/210; 428/334; 428/336; 428/415; 428/417; 428/426; 428/430; 428/432; 428/542.2; 428/913; 156/101; 156/219; 52/306; 52/596
[58] Field of Search ........................ 428/13, 34, 187, 428/195, 210, 201, 336, 415, 334, 417, 426, 430, 432, 437, 212, 542.2, 913; 52/596, 306, 307; 156/101, 213, 273; 427/261, 258, 266, 270, 287

[56] References Cited

U.S. PATENT DOCUMENTS 5,271,973 12/1993 Huether ........................... 428/34
5,370,913 12/1994 Lin .................................. 428/13

FOREIGN PATENT DOCUMENTS 83264 6/1992 China.

*Primary Examiner*—Patrick Ryan
*Assistant Examiner*—Abraham Bahta
*Attorney, Agent, or Firm*—Lowe, Price, LeBlanc & Becker

[57] ABSTRACT

Disclosed is an ornamental glass which can be used as decorative windows, doors, curtain walls, or the like in houses, buildings, automobiles, boats, or any living environments where division between the interior and the exterior is required. In particular, the ornamental glass features an embedded pattern designed for decorative purpose and a oneway light-transmitting quality that allows a viewer standing on the exterior side to see only the designed pattern but not the scene behind while a viewer standing on the interior side can see a translucent view of the exterior scene. The ornamental glass comprises a first sheet of transparent glass; a decorative pattern layer coated upon the first transparent glass sheet, and a second sheet of transparent glass placed upon the layer of decorative pattern. The layer of decorative pattern further includes a coating of water-soluble oil ink upon said first transparent glass sheet; a coating of water-soluble white paint upon said first layer; and a coating of light-obscuring oil ink upon said second layer.

10 Claims, 4 Drawing Sheets

LAMINATED ORNAMENTAL GLASS

BACKGROUND OF THE INVENTION

1. Field of the Invention

The present invention relates in general to an ornamental glass which can be used as decorative windows, doors, curtain walls, or the like in houses, buildings, automobiles, boats, or any living environments where division between the interior and the exterior is required. In particular, the ornamental glass features an embedded pattern designed for decorative purpose and a one-way light-transmitting quality that allows a viewer standing on the exterior side to see only the designed pattern but not the scene behind while a viewer standing on the interior side can see a translucent view of the exterior scene.

2. Description of Prior Art

A conventional methods for making ornamental glass is to directly print the decorative pattern on a sheet of transparent glass or to print the decorative pattern on pieces of resin film or impression paper to be subsequently impressed or adhered to the transparent glass sheet. Another conventional method is to use ceramic pigments to print the decorative pattern on a transparent glass sheet and then process the glass sheet with heat treatment and finally apply polishing paints or another glass sheet as a protective covering. In these conventional methods, the coloring matter can be pigments, paints, or oil inks. Except for the use of ceramic pigments, the use of paints or oil inks has the drawbacks of being non-transparent and easily subject to color-fading after long exposure to sunshine. Therefore, the ornamental glass fabricated by these conventional methods is normally aesthetically not so appealing that its use is usually limited within the interior as room dividers.

There exists a need for an ornamental glass that is aesthetically appealing and also provides one-way light-transmitting quality so it can be used as dividers between the interior and the exterior, not only providing attractive effect to the people walking outside, but also protecting the privacy of the interior.

In response to the foregoing need, the applicant has disclosed a "larninated ornamental glass" granted R.O.C. patent No. 83264. The disclosed ornamental glass provides a one-way light transmitting quality and a decorative pattern which in preferred embodiments is selected from a pattern set consisting of a dotted pattern, a honeycomb pattern, and an oblique quadrille pattern. The decorative pattern is embedded in the ornamental glass by forming three layers of coating between two sheets of transparent glass, including a pattern layer, a coating of white paint, and a coating of black or dark gray oil ink. The decorative pattern itself is non-transparent so that viewers on either sides can see it and light from the exterior side can pass through the blank area in the decorative pattern so as to give lighting to the interior side.

It is found a drawback of the prior art method that the printing of the decorative pattern requires the use of various pigments of different colors including red, blue, yellow, and black and at least three to four times of repeated printing. The coating of white paint requires two times of repeated printing and that of black or dark gray requires at least once; in total seven to eight times of repeated printing are required. The frequent repeated printing for the forming of the decorative pattern provides a difficulty for the fabrication of the ornamental glass, in that there is usually a slight positional deviation between the subsequent printing and the previous one, causing the finally resulted pattern to be somewhat looked smeared on the edges. With this drawback, the prior art method can be used only to make ornamental glass of a size smaller than 0.6 m×1.5 m. There are usually demands for an ornamental glass of a larger size up to 2.5 m×3.5 m, but with the prior art method the fabrication is quite difficult to work out a satisfactory product.

There exists therefore a further need for a method for fabricating ornamental glass in which the repeated times of printing required in the forming of the decorative pattern is reduced so that the resulted decorative pattern would not provide smeared edges, and by which larger sizes of ornamental glass without revealing smeared edges in the decorative pattern can be fabricated.

SUMMARY OF THE INVENTION

It is therefore a primary objective of the present invention to provide a method for fabricating an ornamental glass in which the repeated times of printing required in the forming of the decorative pattern is reduced.

It is another objective of the present invention to provide a method for fabricating an ornamental glass by which any size of ornamental glass without revealing smeared edges in the decorative pattern can be fabricated.

In accordance with the foregoing and other objectives of the present invention, there is provided with a novel ornamental glass and a novel method for fabricating the ornamental glass. The method comprises the following steps of (1) preparing a first sheet of transparent glass; (2) forming a layer of decorative pattern upon the first transparent glass sheet by performing the following substeps of: (2a) coating a top layer of water-soluble screen printing oil ink upon the whole surface of the first transparent glass sheet by means of screen printing; (2b) coating an intermediate layer of water-soluble white paint upon the whole surface of the top layer; and (2c) coating a bottom layer of light-obscuring oil ink in form of the decorative pattern upon the intermediate layer, the bottom layer having a blank portion left between where the light-obscuring oil ink is applied; (4) performing heat treatment to harden the bottom layer of light-obscuring oil ink; (5) etching away portions of the top layer and the intermediate layer that lay beneath the blank portion of the bottom layer by using alcohol; and (6) overlaying a second sheet of transparent glass upon the bottom layer of the decorative pattern. In preferred embodiments, the screen printing oil ink used in Step (2a) is composed of 25–55% by weight of inorganic pigments of black, red, blue, yellow, and white colors mixed with 20–50% by weight of resin, 5–6% by weight of additives including disperser, humidizer, defoaming agent, stabilizer, and adhesion strengthener, and 19–20% by weight of water; in Step (2b) the white paint is coated by means of screen printing, or roll printing, or spraying. In Step (2c) the light-obscuring oil ink is of single-liquid heat-hardened type or duo-liquid heat-hardened type selected from the group consisting of epoxy resin, urethane, and acrylate that is added with a potential hardening agent. In Step (4) the heat treatment is performed at a temperature of 150°–160° C.

BRIEF DESCRIPTION OF DRAWINGS

The file of this patent contains at least one drawing executed in color. Copies of this patent with color drawing (s) will be provided by the Patent and Trademark Office upon request and payment of the necessary fee.

The present invention can be more fully understood by reading the subsequent detailed description of the preferred embodiments thereof with references made to the accompanying drawings, wherein.

DETAILED DESCRIPTION OF PREFERRED EMBODIMENT

Figure 1:
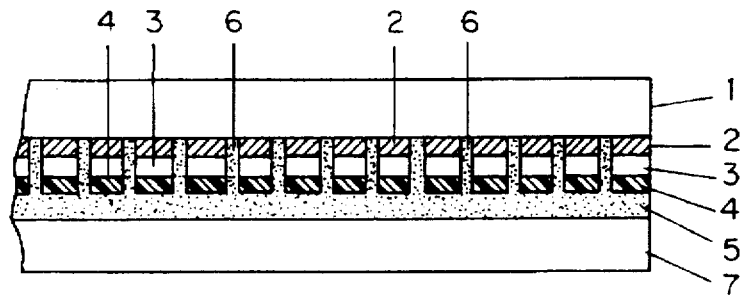
FIG. 1 shows a cross-sectional view of an ornamental glass according to the present invention.

FIG. 1 shows a cross-sectional view of an laminated ornamental glass according to the present invention, which is essentially composed of three layers: (1) a top sheet of transparent glass 1, (2) a layer of decorative pattern composed of three layers of coatings: a top layer of water-soluble screen printing oil ink 2, an intermediate later of white oil ink 3, and a layer of light-obscuring oil ink 4, and (3) a bottom sheet of transparent glass 7.

FIGS. 2A through 2F each shows one procedural step in the process for constructing the laminated ornamental glass according to the present invention.

Figure 2A:
FIGS. 2 A–2F each shows one procedural step in the process for constructing the laminated ornamental glass according to the present invention.

Step 1: Preparing the top transparent glass sheet 1 (FIG.2A)

In the first step, a transparent glass sheet 1 is prepared. The glass sheet 1 is of conventional quality but preferably of heat-enforced type that can withstand forceful impact. Depending on customer demands, the size of the glass sheet 1 can be as large as 2.5 m×3.5 m and thickness is in the range of 3 mm–12 mm, but these dimensions are normally selected according to manufacture or customer specifications and not an important aspect of the present invention.

Figure 2B:
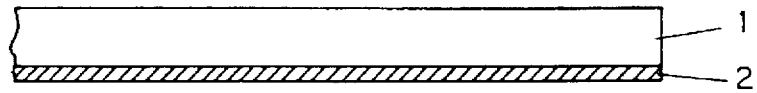

Step (2): Forming the top layer 2 of the decorative pattern (FIG. 2B)

In the second step, a water-soluble screen printing oil ink is coated upon the glass sheet 1 to a thickness of 0.04 mm–0.18 mm by means of screen printing to form the top layer 2 of the decorative pattern. The screen printing oil ink used here is composed of 25–55% by weight of inorganic pigments of black, red, blue, yellow, and white colors mixed with 20–50% by weight of resin, 5–6% by weight of additives including disperser, humidizer, defoaming agent, stabilizer, and adhesion strengthener, and 19–20% by weight of water. The screen printing oil ink is printed upon the whole surface of the glass sheet 1.

Figure 2C:
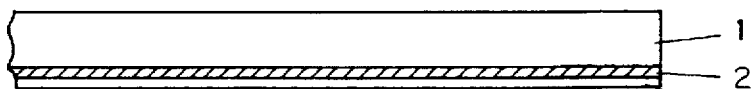

Step (3):Forming the intermediate layer 3 of the decorative pattern (FIG. 2C)

In the third step, a white paint is coated upon the top layer 2 of the water-soluble screen printing oil ink to a thickness of 0.04 mm–0. 18 mm to form the intermediate layer 3 of the decorative pattern. The coating can be performed either by using screen printing, or roll printing, or spraying and is formed upon the whole surface of the top layer 2.

Figure 2D:
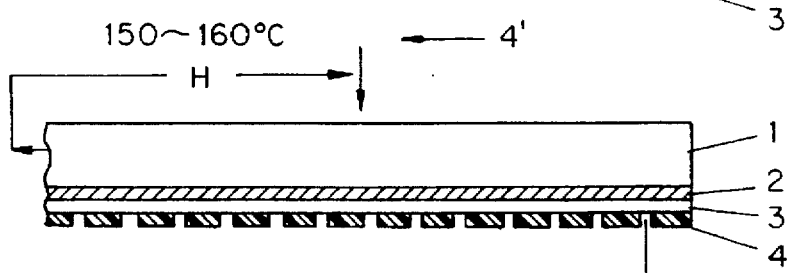

Step (4):Forming the bottom layer 4 of the decorative pattern (FIG. 2D )

Figure 3A:
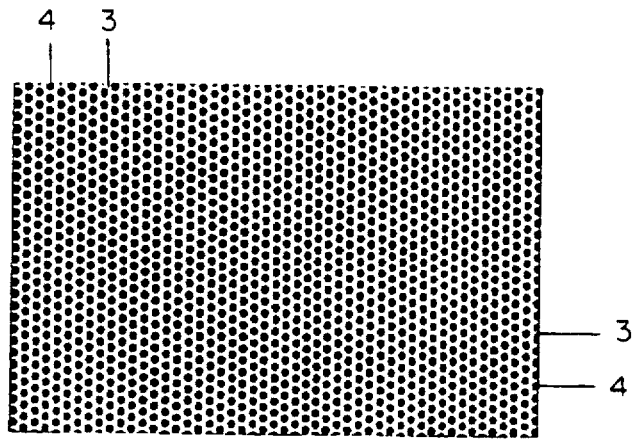
FIGS. 3 A–3C each shows a pattern used to decorate the ornamental glass according to the present invention.
Figure 3B:
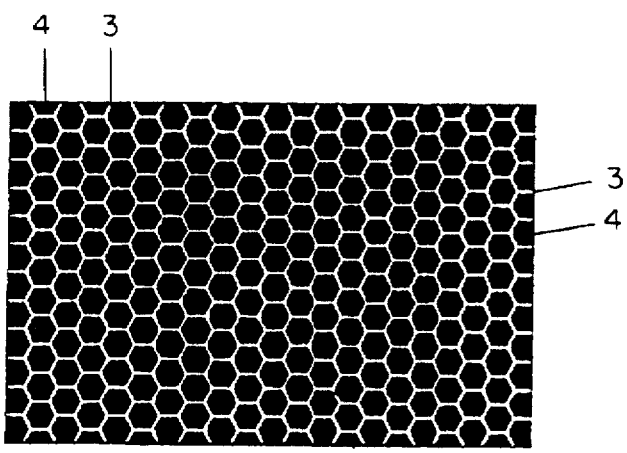
Figure 3C:
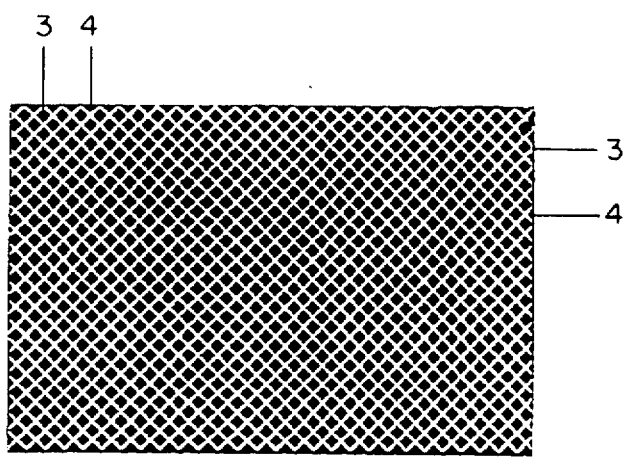

In the fourth step, a decorative pattern selected from a pattern set as for example illustrated in FIGS. 3A–3C is printed upon the intermediate layer 2. The decorative pattern can be of any aesthetic design as those illustrated in FIGS. 3A–3C, in which FIG. 3A shows a dotted pattern consisting of rows of round dots, FIG. 3B shows a honeycomb pattern consisting of rows of solid hexagons, and FIG. 3C shows an oblique quadrille pattern consisting of rows of oblique squares. Essentially the design of the decorative pattern includes a non-translucent portion and a blank portion 6; for example in FIG. 3A the non-translucent portion is a cluster of dots, in FIG. 3B the non-translucent portion is a cluster of hexagons, and in FIG. 3C, the non-translucent portion is a cluster of oblique squares. The non-translucent portion is formed by printing a light-obscuring oil ink upon the intermediate layer 3 to a thickness of 0.04 mm–0.18 mm, leaving the unprinted area as the blank portion 6. The light-obscuring oil ink is preferably black or dark gray in color and is of single-liquid heat-hardened type or duo-liquid heat-hardened type selected from the group consisting of epoxy resin, urethane, and acrylate that is added with a potential hardening agent. After that, heat-treatment at 150°–160° is performed to harden the light-obscuring oil ink.

Figure 2E:
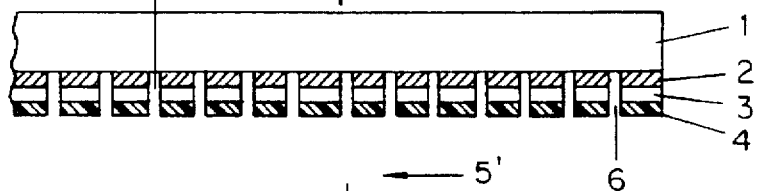

Step (5):Etchini the top layer 2 and the intermediate layer 3 (FIG. 2E)

In the fifth step, etching is performed to the top layer 2 and the intermediate layer 15 3 of the decorative pattern by applying alcohol onto the bottom layer 4. In the etching process, the non-translucent portion of the bottom layer 4 acts as a mask that protects the underlying layers from being etched away and the blank portion 6 allows the alcohol to each away those portions of the top layer 2 and the intermediate layer 3 therebeneath.

Figure 2F:
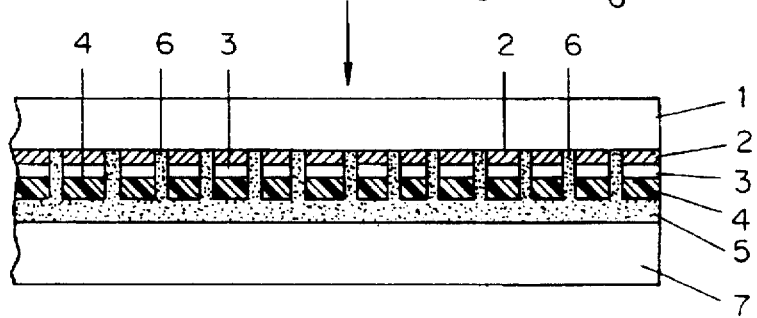

Step (6):Adding the second transparent glass sheet 7 (FIG. 2F)

In the last step, the bottom transparent glass sheet 7 is adhered by using a transparent glue 5 upon the bottom layer 4 such that the bottom transparent glass sheet 7 is used together with the top transparent glass sheet 1 to sandwich the three layers 2, 3, 4 that in combination form the decorative pattern. The glue 5 can be PVB, polyester resin, acrylic resin, duo-liquid epoxy resin, or urethane resin, or single-liquid violet-sensitive adhesive, or heat-hardened adhesive. The bottom transparent glass sheet 7 can be made of the same material as the top transparent glass sheet 1, but it can also be made of poly carbonate.

Demonstration

Figure 4A:
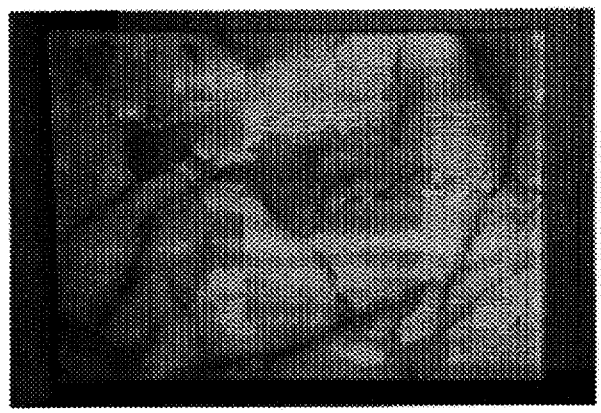
FIGS. 4 A–4B are two photos used to demonstrate the effect of the ornamental glass according to the present invention.
Figure 4B:

FIGS. 4A–4B are photos used to demonstrate the effect of the ornamental glass according to the present invention, wherein FIG. 4A shows the appearance of the ornamental glass when viewing it from the exterior side (from the side of the top glass plate 1), and FIG. 4B shows that of the ornamental glass when viewing it from the interior side (from the side of the bottom glass plate 7). The ornamental glass shown here is designed with a dotted pattern. It can be seen from FIG. 4A that when viewing the ornamental glass from the exterior side, the viewer sees a textured pattern (like that on marbles) and the scene behind the ornamental glass (the interior of the house) cannot be seen. Within a distance of 1 m from the ornamental glass, the viewer can see the dotted pattern of the decorative design; and beyond a distance of 3 m, the dots are too small to be visible and only the marblelike textured pattern is seen.

Oppositely, as shown in FIG. 4B, when viewing the ornamental glass from the interior side, the viewer can see the outside scene blurredly through the blank portion 6 of the dotted pattern and also the dotted pattern on the ornamental glass.

Figure 5A:
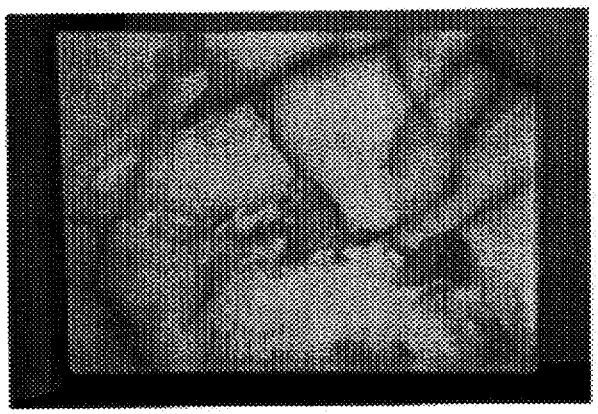
FIGS. 5 A–5B are another two photos used to demonstrate the effect of the ornamental glass according to the present invention.
Figure 5B:
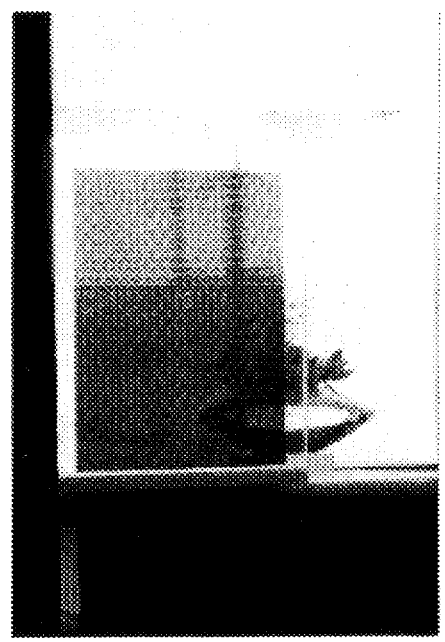

In addition, FIGS. 5A–5B are photos showing another preferred embodiment of the ornamental glass that is designed with a honeycomb pattern consisting of rows of hexagonal blocks. The ornamental glass shown here is the same in effect as that shown in FIGS. 4A–4B except for the viewing of the honeycomb pattern instead of dotted pattern on the ornamental glass.

The light-transmitting ratio through the ornamental glass can be adjusted by changing the ratio of the area of the blank portion of the decorative pattern to the area of the whole ornamental glass. The larger the light-transmitting ratio, the more bright the outside scene appears to the viewer in the interior. Comparing FIG. 3A to FIG. 3B, it can be seen that such a ratio is larger in the decorative pattern of FIG. 3A than that of FIG. 3B; therefore the ornamental glass embedding the decorative pattern of FIG. 3A will have a larger light-transmitting ratio than that embedding the decorative pattern of FIG. 3B. Normally, the ratio of area is adjusted between 3:100 to 65:100 so as to control the light-transmitting ratio in the range from 3% to 65%.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A method for fabricating an ornamental glass, comprising the following steps of:

(1) preparing a first sheet of transparent glass;

(2) forming a layer of decorative pattern upon said first transparent glass sheet by performing the following substeps of:

(2a) coating a top layer of water-soluble screen printing oil ink upon the whole surface of the first transparent glass sheet by means of screen printing;

(2b) coating an intermediate layer of water-soluble white paint upon the whole surface of the top layer; and (2c) coating a bottom layer of light-obscuring oil ink in form of the decorative pattern upon the intermediate layer, the bottom layer having a blank portion left between where the light-obscuring oil ink is applied;

(3) performing heat treatment to harden the bottom layer of light-obscuring oil ink;

(4) etching away portions of the top layer and the intermediate layer that lay beneath the blank portion of the bottom layer by using alcohol; and (5) overlaying a second sheet of transparent glass upon the bottom layer of the decorative pattern.

2. A method as claimed in claim 1, wherein in said Step (2a) the screen printing oil ink is composed of 25–55% by weight of inorganic pigments of black, red, blue, yellow, and white colors mixed with 20–50% by weight of resin, 5–6% by weight of additives including disperser, humidizer, defoaming agent, stabilizer, and adhesion strengthener, and 19–20% by weight of water.

3. A method as claimed in claim 1, wherein in said Step (2b) the white paint is coated by means of screen printing.

4. A method as claimed in claim 1, wherein in said Step (2b) the white paint is coated by means of roll printing.

5. A method as claimed in claim 1, wherein in said Step (2b) the white paint is coated by means of spraying.

6. A method as claimed in claim 1, wherein in said Step (2c) the light-obscuring oil ink is of single-liquid heat-hardened type or duo-liquid heat-hardened type selected from the group consisting of epoxy resin, urethane, and acrylate that is added with a potential hardening agent.

7. A method as claimed in claim 1, wherein in said Step (3) the heat treatment is performed at a temperature of 150°–160° C.

8. An ornamental glass, comprising:

(a) a first sheet of transparent glass;

(b) a decorative pattern layer coated upon said first transparent glass sheet, said decorative pattern being created by by forming three layers of coating, including:

(i) a coating of water-soluble oil ink upon said first transparent glass sheet;

(ii) a coating of water-soluble white paint upon said first layer;

(iii) a coating of light-obscuring oil ink upon said second layer;

(c) a second sheet of transparent glass placed upon said third layer such that said decorative pattern.

9. An ornamental glass as claimed in claim 8, wherein in said coating of water-soluble oil ink is composed of 25–55% by weight of inorganic pigments of black, red, blue, yellow, and white colors mixed with 20–50% by weight of resin, 5–6% by weight of additives including disperser, humidizer, defoaming agent, stabilizer, and adhesion strengthener, and 19–20% by weight of water.

10. An ornamental glass as claimed in claim 8, wherein said coating of light-obscuring oil ink is of single-liquid heat-hardened type or duo-liquid heat-hardened type selected from the group consisting of epoxy resin, urethane, and acrylate that is added with a potential hardening agent.

* * * * *

UNITED STATES PATENT AND TRADEMARK OFFICE
CERTIFICATE OF CORRECTION

PATENT NO. : 5,766,702
DATED : June 16, 1998
INVENTOR(S) : Chii-Hsiung LIN

It is certified that error appears in the above-indentified patent and that said Letters Patent is hereby corrected as shown below:

On the title page, item [*] should read as follows:

-- [*]  Notice:  The term of this patent shall not extend beyond the expiration of Pat. No. 5,370,913.--

Signed and Sealed this

Third Day of November, 1998

Attest:

BRUCE LEHMAN

Attesting Officer

Commissioner of Patents and Trademarks